United States Patent [19]

Connin

[11] 4,126,390
[45] Nov. 21, 1978

[54] JOB STREAM PROGRAMMER APPARATUS

[75] Inventor: John L. Connin, Canandaigua, N.Y.

[73] Assignee: Eastman Kodak Company, Rochester, N.Y.

[21] Appl. No.: 793,109

[22] Filed: May 2, 1977

[51] Int. Cl.² .................... G03G 15/00; B65H 5/14
[52] U.S. Cl. ................................. 355/14; 271/3.1; 271/204; 271/277; 355/3 R
[58] Field of Search .................. 271/3.1, 204, 277; 355/3 R, 14, 16, 100, 102

[56] References Cited

U.S. PATENT DOCUMENTS

| | | | |
|---|---|---|---|
| 2,355,697 | 8/1944 | Belluche | 271/204 X |
| 3,275,318 | 9/1966 | Lavander | 271/204 |
| 3,770,348 | 11/1973 | Martin | 355/102 |
| 3,937,454 | 2/1976 | Colwill | 271/3.1 X |
| 4,023,670 | 5/1977 | Mathes et al. | 271/3.1 X |
| 4,025,186 | 5/1977 | Hunt et al. | 355/14 |

Primary Examiner—A. D. Pellinen
Attorney, Agent, or Firm—Raymond L. Owens

[57] ABSTRACT

Job stream programmer apparatus for use with a recirculating feeder and copier adapted to produce production runs of predetermined numbers of copies of single or multi-sheet documents, includes a first mechanism for receiving a plurality of multi-sheet documents and for moving them along a predetermined path which intersects the feeder, and a second mechanism for releasing a particular one of the received multi-sheet documents from the first document and inserting it into the feeder, which in turn, in accordance with job program instructions corresponding to the inserted document, feeds the sheets of the inserted document to the copier for copying.

7 Claims, 17 Drawing Figures

JOB PROGRAMMING FORM

NUMBER OF COPIES (SETS)

| HUNDREDS | TENS | UNITS |
|---|---|---|
| 0 ☐  1 ☐ | 0 ☐  1 ☐ | 0 ☐  1 ☐ |
| 2 ☐  3 ☐ | 2 ☐  3 ☐ | 1 ☐  3 ☐ |
| 4 ☐  5 ☐ | 4 ☐  5 ☐ | 2 ☐  5 ☐ |
| 6 ☐  7 ☐ | 6 ☐  7 ☐ | 3 ☐  7 ☐ |
| 8 ☐  9 ☐ | 8 ☐  9 ☐ | 4 ☐  9 ☐ |

REDUCTION

☐ ☐ ☐

| IMAGING | PAPER SUPPLY | EXIT |
|---|---|---|
| ONE SIDED  TWO SIDED | UPPER  LOWER | TOP  SIDE |
| ☐  ☐ | ☐  ☐ | ☐  ☐ |

| COLLATE | STAPLE | OFFSET STACK |
|---|---|---|
| YES  NO | YES  NO | YES  NO |
| ☐  ☐ | ☐  ☐ | ☐  ☐ |

| INSERT COVERS | | PRINT COVER SHEET |
|---|---|---|
| YES  NO | | YES  NO |
| ☐  ☐ | | ☐  ☐ |

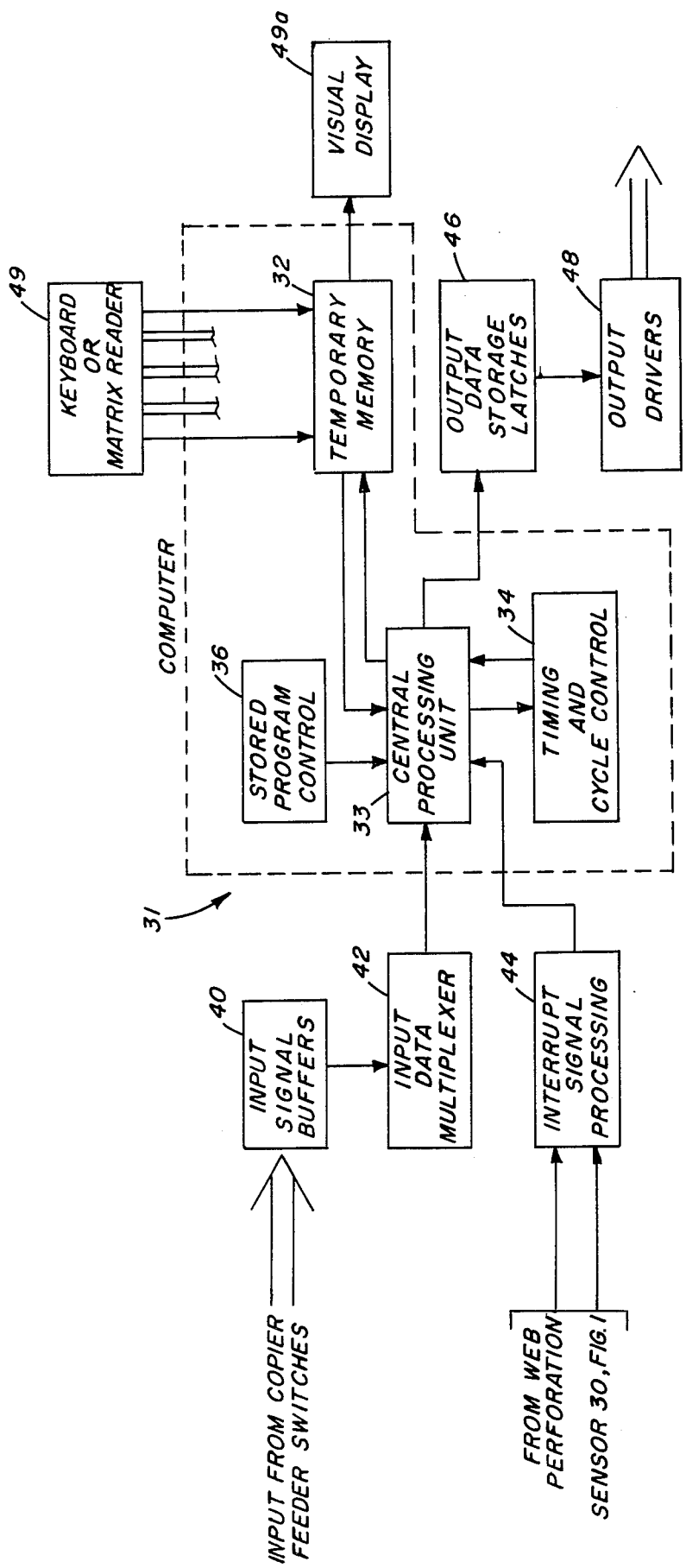

JOB STREAM PROGRAMMER APPARATUS

CROSS-REFERENCE TO RELATED APPLICATIONS

Reference should be made to commonly assigned, co-pending U.S. patent applications, the disclosures of which are incorporated by reference herein: U.S. patent application Ser. No. 671,867, entitled: Automatic Transfer From Collate to Noncollate Mode of Recirculating Feeder and Copier Operation, filed: Mar. 30, 1976, in the names of L. Burlew et al; issued Mar. 14, 1978, U.S. Pat. No. 4,078,787; U.S. patent application Ser. No. 739,895 entitled: Copier/Duplicator, Priority Interrupt Apparatus, filed: Nov. 8, 1976 to J. Connin.

BACKGROUND OF THE INVENTION

1. Field of the Invention

This invention relates to job stream programmer apparatus for increasing the productivity of a copier having a feeder.

2. Description of the Prior Art

Often there is a queueing problem at a copier. This problem can be illustrated by the example where there is a single copier which has a dedicated operator. As customers arrive they form a line or queue. For high production runs, copiers are often provided with a sorter to produce collated copy sets. However, an undesirable amount of operator time is required to unload the sorter bins. During this unloading time the copier is idle. One relatively effective means of reducing copier idle time has been by using a recirculating feeder. In one type of a recirculating feeder, a multi-sheet document is inserted into the feeder tray and the document sheets are circulated from the bottom of the document to an exposure platen copied and then circulated back to the top of the document until the desired number of collated copies of the document are produced without a sorter accessory. This, of course, helps to reduce copier idle time which occurs when an operator unloads a sorter. Frequently, when the operator is receiving information from a customer about his production run, the copier is idle or waiting for operating instructions. Even with this type of recirculating feeder, situations still exist where a copier is idle and customers are waiting. To minimize queueing, another service person may be provided to take copying instructions and help unload completed jobs during the peak demand periods, or alternatively another copier may be added. Either of these two approaches can significantly increase operating costs.

Another type of apparatus which may produce collated copy set without the need for a sorter accessory is shown in IBM Technical Disclosure Bulletin Vol. 18, No. 12 (May, 1976). In this apparatus, a plurality of movable document receiving bins are provided. Two bins are assigned to each document. An operator inserts the document to be copied into the first such bin, and this bin is moved to a feeding position. Document sheets are fed seriatim to a copier exposure platen copied, and then returned to the second bin. If the document is to be copied again, the second bin is moved to the feeding position, and the document sheets are again fed seriatim to the copier exposure platen. These document sheets are returned to the first bin. This process is repeated until the desired number of copies of the document are made. With this approach, the document sheets are fed along extended document sheet paths in their travel to and from receiving bins, with an attendant likelihood of document sheet jams.

SUMMARY OF THE INVENTION

In accordance with the invention, job stream programming apparatus is disclosed which reduces the customer waiting line problem by decreasing copier idle time. The job stream programmer apparatus includes a mechanism adapted to receive a plurality of single and multi-sheet documents and moves them along a predetermined path, which intersects the document feeder of a copier. The job stream programmer apparatus further includes means which release and insert a particular one of the received documents into a feeder for copying in accordance with job programming instructions corresponding to the inserted document.

When the copier has copied a document sheet, the feeder automatically transports it to a receiving receptacle. The job stream programmer then inserts the next document to be copied into the feeder and the copying process is repeated.

BRIEF DESCRIPTION OF THE DRAWINGS

For a more complete understanding of the instant invention as well as its advantages and features, the invention will be described in conjunction with the accompanying drawings, in which:

FIG. 2H depicts a job programming form which may be read by a matrix reader 204 shown in FIG. 2 for transferring programming information into the logic and control unit of FIG. 4;

FIG. 4 is a block diagram of the logic and control unit shown in FIG. 1;

DESCRIPTION OF THE PREFERRED EMBODIMENT

Before proceeding with a detailed description of the preferred embodiment, it will be useful to consider, from a general point of view, an electrophotographic copier, a job stream programmer apparatus, a logic and control unit, and a recirculating document feeder. Thereafter, the job stream programmer apparatus will be set forth in detail. At the outset, it will be noted that although the job stream programmer apparatus is suitable for use with a recirculating feeder, it can also be used with other types of document feeders.

In this disclosure, the feeder is said to be able to operate in collate or noncollate modes of operation. However, since the feeder must be coupled to a copier for copies to be made, it will be understood it is the feeder and the copier which actually function in these modes of operation. Whenever the term "document" is used it refers to particular sheets of originals (either single or multiple) which are to be copied in accordance with production run or job stream instructions. The term "copy sheet" refers to the output of the copier.

Electrographic Copier Recirculating Feeder and Job Stream Programmer (General Discussion)

Figure 1:
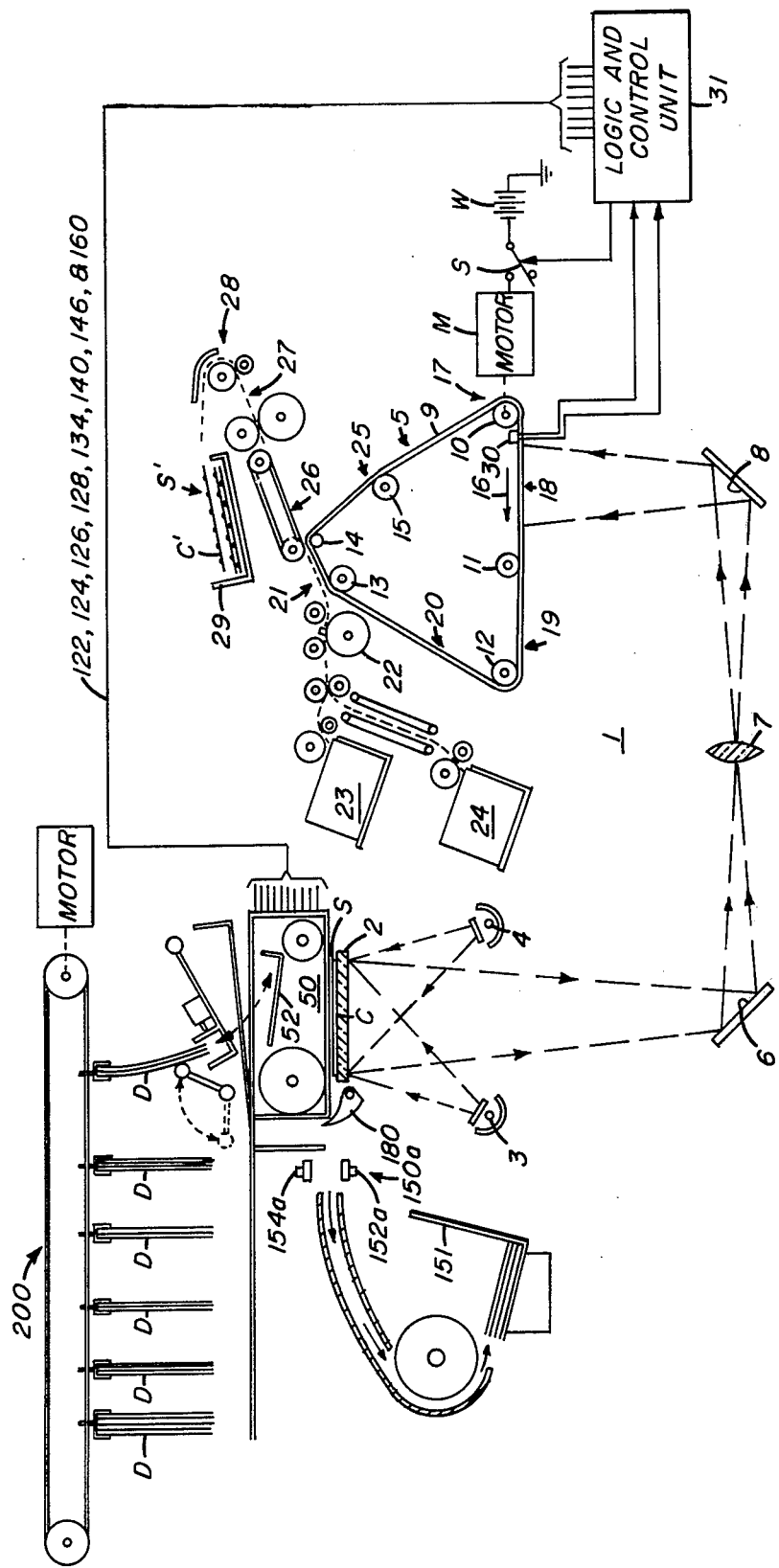
FIG. 1 is a schematic front elevational view of apparatus in accordance with the invention including a job stream programmer apparatus, a web-type electrophotographic copier, and a recirculating document feeder all of which are controlled by a logic and control unit.
Figure 2:
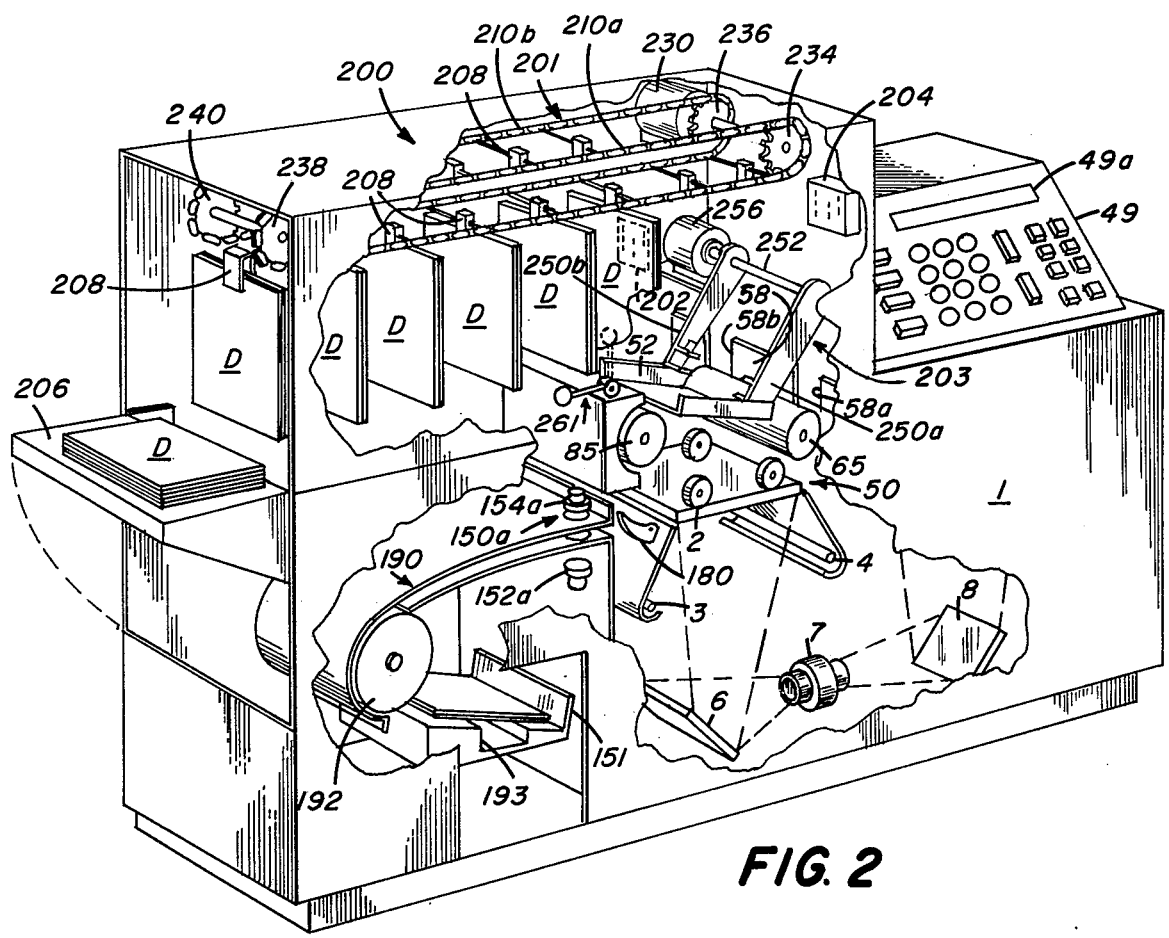
FIG. 2 is a partly cutaway perspective of the job stream programming apparatus of FIG. 1.

Referring to FIG. 1 and FIG. 2 in the drawings, and in particular to FIG. 1, there is schematically illustrated an electrophotographic copy/duplicator apparatus referred to herein as a copier 1, a recirculating feeder 50 and a job stream programmer apparatus 200.

The job stream programmer 200 receives and moves documents (i.e. single or multi-sheet documents) along a path which intersects the recirculating feeder 50 and at the appropriate time inserts a particular one of the documents into the feeder tray 52. The recirculating feeder 50 then recirculates document sheets past an exposure platen 2 where they are copied. After a document has been completely copied the desired number of times collated sets of copy sheets are disposed in a tray 29 of the copier and the original document is disposed in a receptacle 151.

The recirculating feeder 50 places a selected side C of a sheet S of an original document so that the selected side C faces the exposure platen 2 of the copier 1. The platen 2 is constructed of transparent glass. When energized, two xenon flash lamps 3 and 4 illuminate the selected side C of the original sheet S (refer briefly to FIG. 3). By means of an object mirror 6, a lens 7, and an image mirror 8, a light image of the selected side C is reflected back from the exposure platen 2 and projected as an inverse or mirror image onto a discrete section of a photoconductive web 5. The recirculating feeder 50 feeds individual document sheets in succession from the bottom of the document to the exposure platen and returns such sheets to the top of the document while maintaining the original orientation. After a sheet has been copied the desired number of times, a gate 180 in the feeder 50 adjacent to the platen 2 is opened and the original sheet is fed to the receiving receptacle 151.

Only those features of the copier 1 which are helpful for a full understanding of the preferred embodiment are described hereinafter. However, a more complete description of the copier may be found in commonly assigned U.S. Pat. No. 3,914,047, patented: Oct. 21, 1975, in the names of Hunt et al.

The copier 1 includes photoconductive web 5 having photoconductive or image receiving surface 9, a transparent support backing and intermediate conductive layer. The web 5, an endless or continuous member, is trained about six transport rollers 10, 11, 12, 13, 14 and 15. Roller 10 is coupled to a drive motor M. When a switch S is closed by a logic and control unit (LCU) 31 a source of potential W energizes the motor and roller 10 is driven. Roller 10 causes the web 5 to move in a clockwise direction as indicated by arrow 16. This movement causes successive sections of the web 5 to sequentially pass a series of electrophotograhic work stations. For the purpose of the instant disclosure, the several work stations along the web's path of movement may be described as follows:

a charging station 17 at which the photoconductive surface 9 of the web 5 is sensitized by the application of a uniform electrostatic charge;

an exposure station 18 at which the inverse image of the selected side C of the original sheet S is projected onto the photoconductive surface 9 of the web 5; the image dissipates the electrostatic charge at the exposed areas of the photoconductive surface and forms a latent electrostatic image thereon which corresponds to the indicia on the selected side C of the original sheet S;

a developing station 19 at which developing powder, including toner particles having an electrostatic charge opposite to that of the latent electrostatic image, is brushed over the photoconductive surface 9 of the web 5; the toner particles are attracted to the latent electrostatic image to visibly form a toner particle or developer image which is a mirror resemblance of the indicia on the selected side C of the original sheet S;

a postdevelopment erase station 20 at which the web is illuminated to relieve electrical stress in the web 5 and thus reduce photoconductor fatigue, i.e. the inability to accept or hold an electrostatic charge;

a transfer station 21 at which the developed image is electrostatically transferred from the photoconductive surface 9 of the web 5 to a receiving side C' of a copy sheet S' (movement of the copy sheet is checked by a registration device 22 to ensure its arrival at the transfer station, from either one of two supply bins 23 and 24, coincidentally with the arrival of the developed image at the transfer station); and a cleaning station 25 at which the photoconductive surface 9 of the web 5 is cleaned by any residual toner particles remaining thereon after the developed image has been transferred; the web is also discharged of any residual electrostatic charge remaining thereon.

The developed image, as transferred onto the copy sheet S', has the same indicia configuration as that of the original sheet S. After receiving the developed image at the transfer station 21, the copy sheet S' is separated from the web 5 at the roller 14 and is carried by a vacuum transport 26 to a fusing station 27. The fusing station 27 serves to fix the developed image by fusing the toner particles to the receiving side C' of the copy sheet S'. Finally, the copy sheet S' is moved through a guide and feed roller arrangement 28 to the completed copy tray 29. As depicted in FIG. 1, the copy sheet S' is deposited in the copy tray 29 with fixed image or receiving side C' facing upwardly on top of an earlier, similarly deposited copy sheet.

To coordinate operation of the various work stations 18, 19, 21 and 25 with movement of the image areas on the web 5 past these stations, the web has a plurality of uniformly spaced perforations, not shown, along one of its edges. At a fixed location along the path of the web movement, there is provided suitable means 30 for sensing web perforations. This sensing generates input signals into a LCU 31 having a digital computer. The digital computer has a stored program responsive to the input signals for sequentially actuating then de-actuating the work stations as well as for controlling the operation of many other machine functions as disclosed in U.S. Pat. No. 3,914,047. The LCU 31 also controls the operation of the job stream programmer apparatus 200 as will be set out later in this specification.

Logic and Control Unit 31

The LCU 31 includes a minicomputer or microprocessor computer. Programming of commercially available minicomputers or microprocessors, such as INTEL MODEL 8008 or MODEL 8080 microprocessor (which along with others can be used in accordance with the invention), is conventional and well understood in the art. The following disclosure is written to enable a programmer having ordinary skill in the art to produce an appropriate program for the computer. The particular details of any such program would, of course, depend upon the architecture of the selected computer.

Turning now to FIG. 4, a block diagram of a typical logic and control unit (LCU) 31 is shown which interfaces with the copier 1 and the feeder 50. The LCU 31 consists of temporary data storage memory 32, central processing unit 33, timing and cycle control unit 34, and stored program control 36. Data input and output is performed sequentially under program control. Input data is applied through either input signal buffer 40 to a multiplexer 42 or to signal processor 44 from perforations detected on the web 5. The input signals are derived from various switches, sensors, and analog-to-digital converters. The output data and control signals are applied to storage latches 46 which provide inputs to suitable output drivers 48 which are directly coupled to leads which, in turn, are connected to the work stations. More specifically, the output signals from the LCU 31 are logic level digital signals which are buffered and amplified to provide drive signals to various clutches, brakes solenoids, power switches, and numeric displays in the copier, job stream programming apparatus 200 and the feeder 50. The LCU 31 processing functions can be programmed by changing the instructions stored in the computer memory.

The time sequence of machine control signals (often referred to in the art as events) is critical to the copy cycle because the copier and feeder stations and associated mechanisms must be powered ON and OFF in the correct sequence to assure high quality copying and to prevent paper misfeeds, misregistration, and erratic operation. One way of controlling the time sequence of events and their relationship to each other is, as noted above, to sense perforations which correspond to the location of the image elements on the web 5 since these elements continue through the cycle of the copier's endless path. Thus, the detection of perforations by a sensor 30 is applied to the LCU 31 through the interrupt circuit 44 (see FIG. 4) and is used to synchronize the various control mechanisms with the location of the image elements. These perforations generally are spaced equidistant along the edge of the web member 5. For example, the web member 5 may be divided into six image areas by perforations referred to as F perforations (not shown) and each image area may be subdivided into 51 sections by perforations referred to as C perforations (not shown). These F and C perforations (not shown) are described in detail in U.S. Pat. No. 3,914,047.

Returning now to the computer, program instructions are hard wired into stored program control 36 which may be provided by a conventional Read Only Memory (ROM). The ROM contains the operational program in the form of instructions and fixed binary numbers corresponding to numeric constants. These programs are permanently stored in the ROM and cannot be altered by the computer operation.

Typically, the ROM 36 is programmed at the manufacturer's facility, and the instructions programmed provide the required control functions such as: control of job stream programmer apparatus (see FIG. 7), jam recovery, operator observable logic, machine timing, and automatic document rearrangement. For a specific example, the total ROM capacity may be approximately 2,000 bytes with each byte being 8 bits in length. The program may require more than one ROM.

The temporary storage memory 32 may be conveniently provided by a conventional Read/Write Memory. Read/Write Memory or Random Access Memory (RAM) differs from ROM in two distinct characteristics:

1. Stored data is destroyed by removal of power; and
2. The stored data is easily altered by writing new data into memory.

As a specific example, the RAM capacity may be 256 bytes; each byte being 8 bits in length. Data, such as: copy requested count, copies processed count, and copies dedelivered count are stored in the RAM until successful completion of a copy cycle. The RAM is also used to store data being operated on by the computer and to store the results of computer calculations.

Each of the documents in the job stream programmer 200 must have assigned to it the number of copies to be made and whether or not such copies are to be collated. This function will be referred to as job programming. Other job programming parameters for each (document) production run may also be assigned to each production run such as:

.Paper supply selected
.Exit selected
.Copying mode selected (one or two-sided)
.Status of two-sided if selected
  .front side
  .back side
  .recopy
  .paper fed count
.Billing data
.Illumination level As shown in FIG. 4 (also see FIG. 2) a keyboard 49 is provided which includes a series of buttons which permit the the operator to enter words into the storage 32 corresponding to job programming. When writing into the storage 32 from the keyboard 49, the operator assigns a digit corresponding to the document on the job stream programmer 200. Although not shown, the keyboard 49 may include apparatus which permits selective editing of production run information. Commercially available keyboards permit this function by using skip and reset buttons. A typical keyboard which may be used in accordance with the present invention is shown in FIG. 1 of U.S. Pat. No. 3,290,987. The production run contents of the memory unit 32 are continuously monitored and displayed on a visual display 49a.

Turning to FIG. 2H there is shown a job programming form 202 completed by an operator and inserted as the first page of a document to be copied. The form 202 is a pre-printed piece of paper which itemizes the various options available in a copier. Corresponding to each item and located in areas compatible with a matrix reader 204 are boxes corresponding to the possible choices for each option. This form would normally be filled out when the original document is submitted to a reproduction center by marking the appropriate boxes with suitable machine readable marking means such as a pencil.

The matrix reader 204 is a device which will detect, at predetermined locations, the presence or absence of marks on a prepared form. The detected marks (data) are converted to electrical signals and presented in a suitable digital format to the LCU 31. Matrix readers of this type are currently being incorporated into cash registers used by some fast food chains. In this application, the reader detects marks on an order ticket which identifies the quantity and type of food ordered. This information is processed by the electronic cash register which enters the cost of each item, totals the bill, computes the sales tax and prints a sales receipt. In the same way, the matrix reader 204 provides input job programming information into the temporary memory 32 of the LCU 31 shown in FIG. 4. For the sake of clarity of illustration, the block 49 has been labeled keyboard or matrix reader. The keyboard is also shown in FIG. 2.

A matrix reader arrangement would typically be employed in a high volumn reproduction center. In this environment, the documents to be reproduced would be submitted to the reproduction center and form 202 shown in FIG. 2H would be filled out by either the requestor or a machine operator. The request form 202 would then be placed on the top of its corresponding document. At the time when the document is at a position where the form 202 is adjacent the reader 204, the LCU 31 signals the matrix reader 204 to read the job programming information on such form. In response to the form information, the LCU 31 causes the feeder 50 and copier 1 to operate in accordance with the selected functions after the document has been inserted into the feeder 50.

Those skilled in the art will appreciate that it is not necessary to complete the entire form 202. For example, if only information concerning the number of copies to be reproduced is included then the remaining parameters default to a standard configuration such as:

Reduction 1:1
Imaging 1 sided
Paper Supply Upper
Exit Side
Collate Yes
Staple No
Offset Yes
Insert Cover No If a finisher such as a stacker/stapler were used and it was requsted that copies be stapled, it would not be necessary to specify the exit required since the copies must be sent to stacker/stapler. Also, if conflicting information was specified on the request form, the logic could be programmed to select the most rational features or to notify the operator of a conflict. As will be understood by those skilled in the art, a matrix reader arrangement could be advantageously employed by a copier which did not have a job stream programmer apparatus. A matrix reader arrangement increases productivity of electrographic copiers in a reproduction environment. This is accomplished by significantly reducing the set-up time required for each reproduction job. This is particularly advantageous on newer versions of copiers since these copiers provide a number of features and options which require manual selection. In addition to reducing machine set-up time, the matrix reader arrangement reduces human errors in translating selected machine functions into the copier logic. As will be discussed later in connection with FIG. 7, if a matrix reader is employed, then the form 202 will not be copied.

Figure 3:
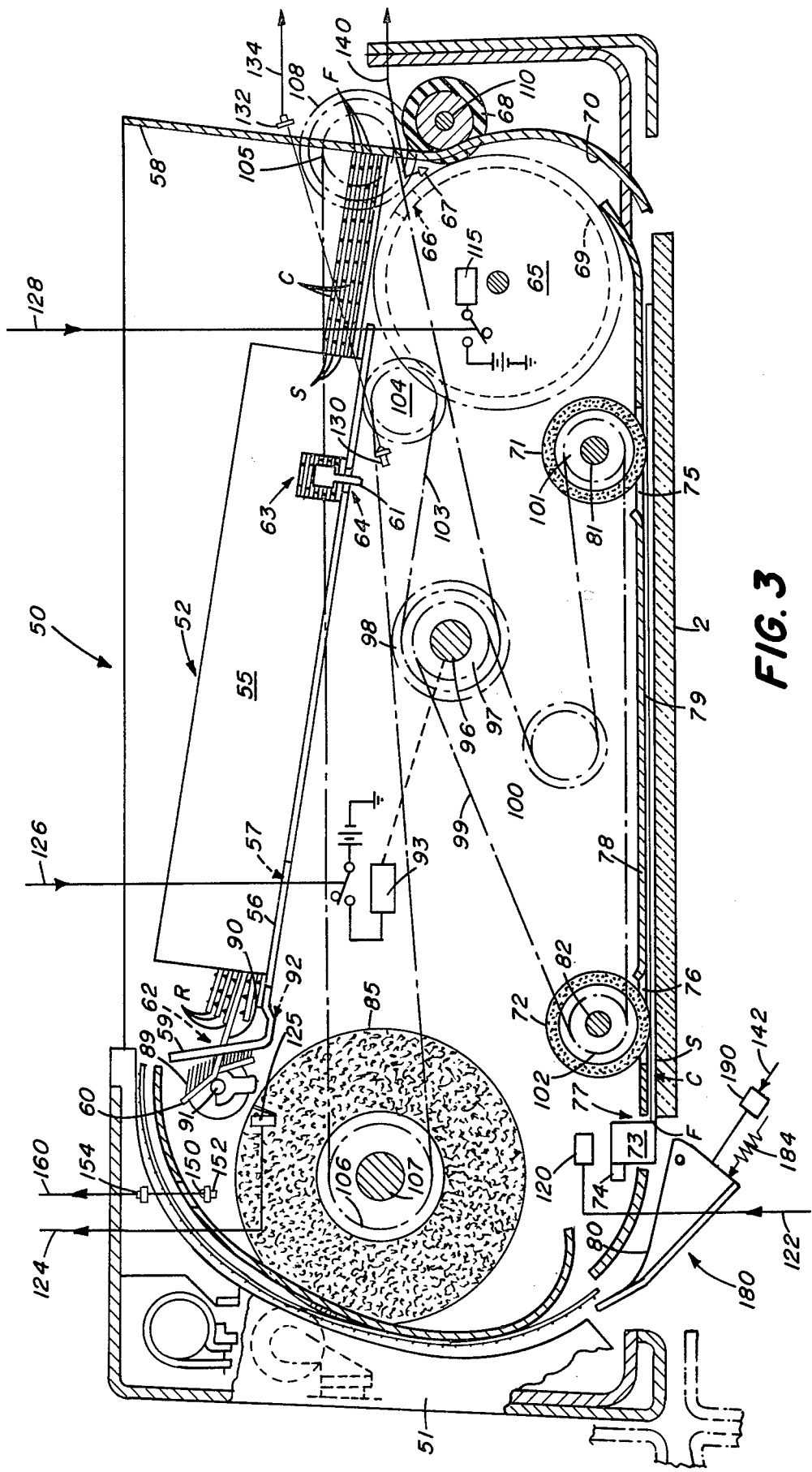
FIG. 3 is an enlarged front elevation view, partly in section, of the recirculating feeder of FIG. 1.

Recirculating Feeder (FIG. 3)

For access to the exposure platen 2, the recirculating feeder 50 is positioned directly on top of the exposure platen 2 of the copier 1. The recirculating feeder 50 is raised at a front end 51; the entire feeder pivots about a rearwardly located connection, (not shown) with the copier 1. With this feeder 50, a plurality of sheets of a document can be repeatedly fed in succession from the bottom of an originating stack to the exposure platen 2 of the electrophotograhic copier 1. This is done by returning the sheets to the top of the document to maintain the original order or sequence. The LCU 31 synchronizes the operation of the feeder 50 with the copier 1.

As illustrated in FIG. 2, the recirculating feeder 50 is loaded by the job stream programmer apparatus 200 inserting a document into a supply tray 52. The sheets S, stacked but not shown in the tray 52, are oriented with their respective sides C, selected for copying, facing upwardly. Returning to FIG. 3, an air space is provided between ribs (not shown) and the bottommost document sheet in the stack and the floor plate to facilitate removal of the bottom-most sheet from the stack. The side edge guides 55 are mounted in respective slots 57 in the floor plate 56 for movement toward and away from each other to accommodate different lengths of sheets. The movement of the edge guides is controlled by the LCU 31. The tray 52 is inclined downwardly to the right, causing the forward or leading edges F of the sheets S to register against a forward wall plate 58. The rearward or trailing edges R of the sheets S are spaced from a rearward wall plate 59 of the tray 52. During the feeding cycle in which the sheets S are removed from the stack bottom and returned to the stack top, an end jogger 60 and a side jogger 61 separately move back and forth striking the sheets to align them with each other in the stack. Openings 62 are provided in the rear wall plate 59 of the tray 52 and in one of the edge guides 55 for passage of the end and side joggers 60 and 61. The end joggers 60 are movably adjustable to accommodate different width documents.

A rotatably supported vacuum cylinder 65 extends partially into the space between the floor plate 56 and the wall plate 58. The vacuum cylinder, which is hollow, is sealed except for a plurality of elongate air intake ports 66 and an air out-take opening, not shown. Suitable conduit and gasket means, not shown, connect the air out-take opening with a vacuum source in the copier 1 for drawing air from the cylinder interior. Initially, the vaccum cylinder 65 is oriented with the air intake ports 66 in a starting position beneath the forward edge F of the bottom-most sheets S in the tray 52. Air rushing into the intake ports 66 causes the forward edge F to peel away from the stack bottom and adhere to the vacuum cylinder 65. The vacuum cylinder 65 is then rotated slightly clockwise to draw the bottommost sheet S from the document only enough to deliver its forward edge F into respective feeding nips defined by continuously rotating feed rollers 68 and backup rings 69. The remaining sheets S are prevented from separating from the document by the engagement of their forward edges F with the wall plate 58. Backup rings 69 extend around the vacuum cylinder 65 and rotate with respect to the vacuum cylinder and about the same axis. The backup rings 69 cooperate with the feed rollers 68 to effect complete removal of the bottom-most sheet from the stack and to feed the removed sheet along an arcuate guide 70 to the exposure platen 2. A drive mechanism connected to an electric, one revolution clutch 115, is provided for intermittently oscillating the vacuum cylinder 65 to deliver the forward edges of the sheets, one at a time, from the bottom of the document to the feeding nips between the feed rollers 68 and backup rings 69. When energized by the LCU 31 through lead 128, the clutch causes an intermittent drive mechanism not shown to be connected to the cylinder 65 which rotates back and forth once. This rotation of the cylinder 65 causes a single document sheet to be fed to the exposure platen 2. For a more complete discussion of the process of feeding document sheets to the exposure platen 2, reference can be made to the patent applications referred to in the section of this specification entitled: "Cross Referenced to Related Applications".

After exiting from the arcuate guide 70, each sheet S is deposited with its side C selected for copying facing downwardly on the platen 2. Two sets of continuously rotating feed rollers 71 and 72 move the sheet S, selected side C downwardly, along the platen 2 and into registration therewith for exposure. During such registration, the sheet S lies stationary on the exposure platen 2 with its forward edge F against two registration pads 73 (only one of which is shown) which are spaced apart from each other on a registration bar 74. The registration pads 73 and bar 74 are located along the feed path in at the platen end farthest removed from the supply tray 52. Because the feed rollers 71 and 72 urge the sheet S against both of the registration pads 73, any skew in the sheet S is corrected before it is exposed. Feed rollers 71 and 72 and the registration pads 73 depend through respective openings 75, 76 and 77 in a backup plate 78. This plate 78 extends substantially parallel to the platen 2. A light reflective material, serving as a light shield during exposure, is coated on the side 79 of the plate 78, which side faces the platen 2. While the registration pads 73 block movement of the sheet S, feed rollers 71 and 72 continue to rotate, slipping on the backside of the sheet. This slipping occurs for a fraction of a second during the time the sheet is stationary (between registration of the sheet and its exposure). After exposure, a pulse carried by a lead 22 from the LCU 31 actuates a solenoid 120 to retract the registration bar 74, with the registration pads 73, from the feed path and out of the way of the sheet S. Then, the rotating rollers 71 and 72 immediately expel the sheet S from the exposure platen 2 and move the sheet onto an arcuate guide 80. As shown in FIG. 3, to again move the registration bar 74 with the registration pads 73 for the sheet registration, the LCU 31 deactivates the solenoid 120.

Feed rollers 68, 71, 72 and 85 are continuously rotated. The mechanism for causing their rotation will now be briefly described. A drive shaft 96 and two side-by-side drive pulleys 97 and 98 are rotated by a drive motor 93 which has been energized by a source of potential in the lead 126 from the LCU 31. Rotation of the drive pulley 97 moves an endless drive belt 99 which rotates a belt tensioning pully 100 and two roller pulleys 101 and 102. By rotating the roller pulleys 101 and 102, their respective shafts 81 and 82 rotate the feed rollers 71 and 72. Also, rotation of the drive pulley 98 moves an endless drive belt 103 which rotates a belt tensioning pulley 104 and two roller pulleys 105 and 106. By rotating the roller pulley 106, a roller shaft 107 causes the rotation of the feed roller 85. The roller pulley 105 rotates two engaging gear wheels, with only one of the gear wheels 108 being shown. By rotating the gear wheel 108, a roller shaft 110 is rotated and in turn causes the feed rollers 68 to rotate.

Figure 5:
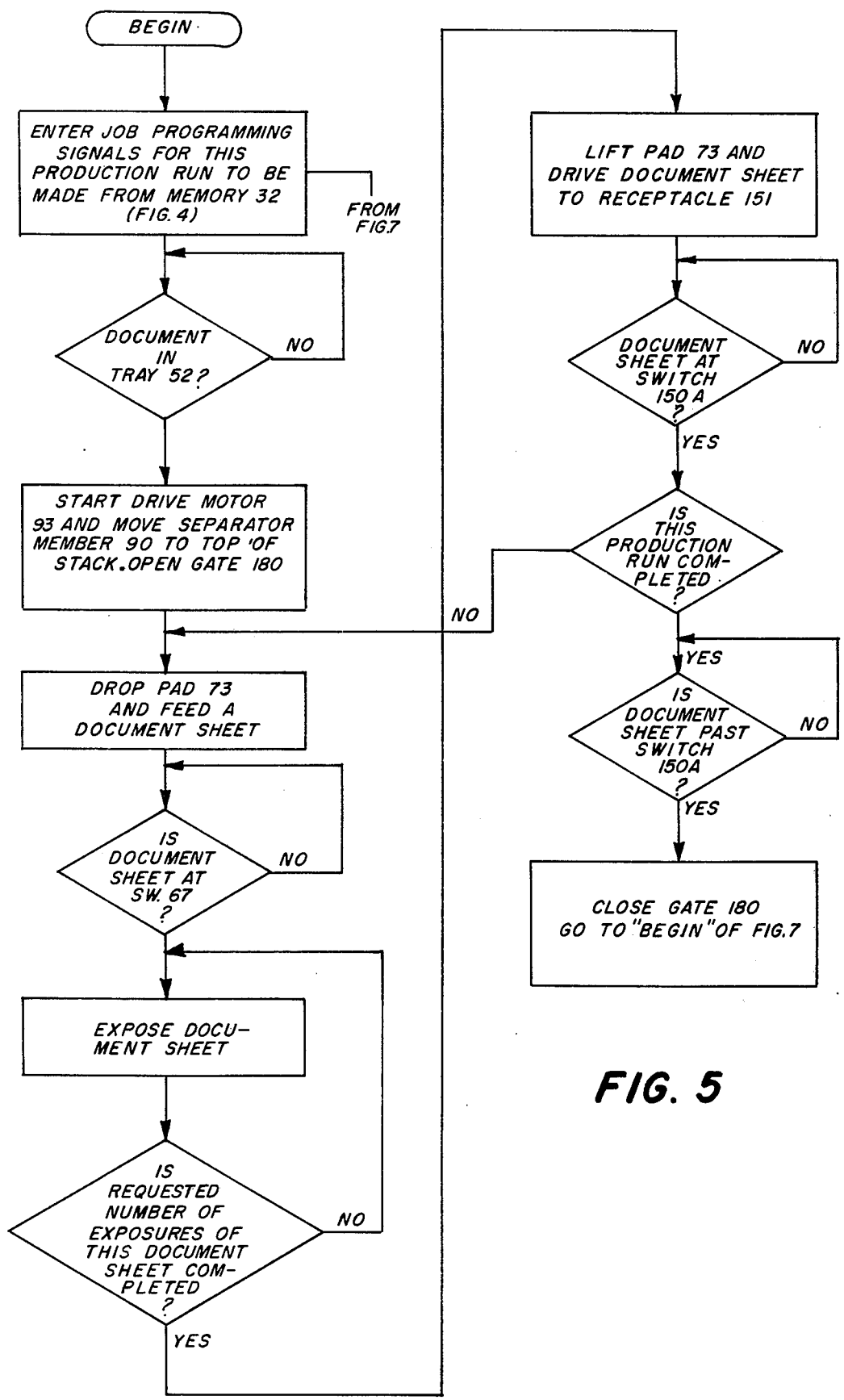
FIG. 5 is a flow chart of the noncollate mode of operating the feeder and copier of FIG. 1.
Figure 6:
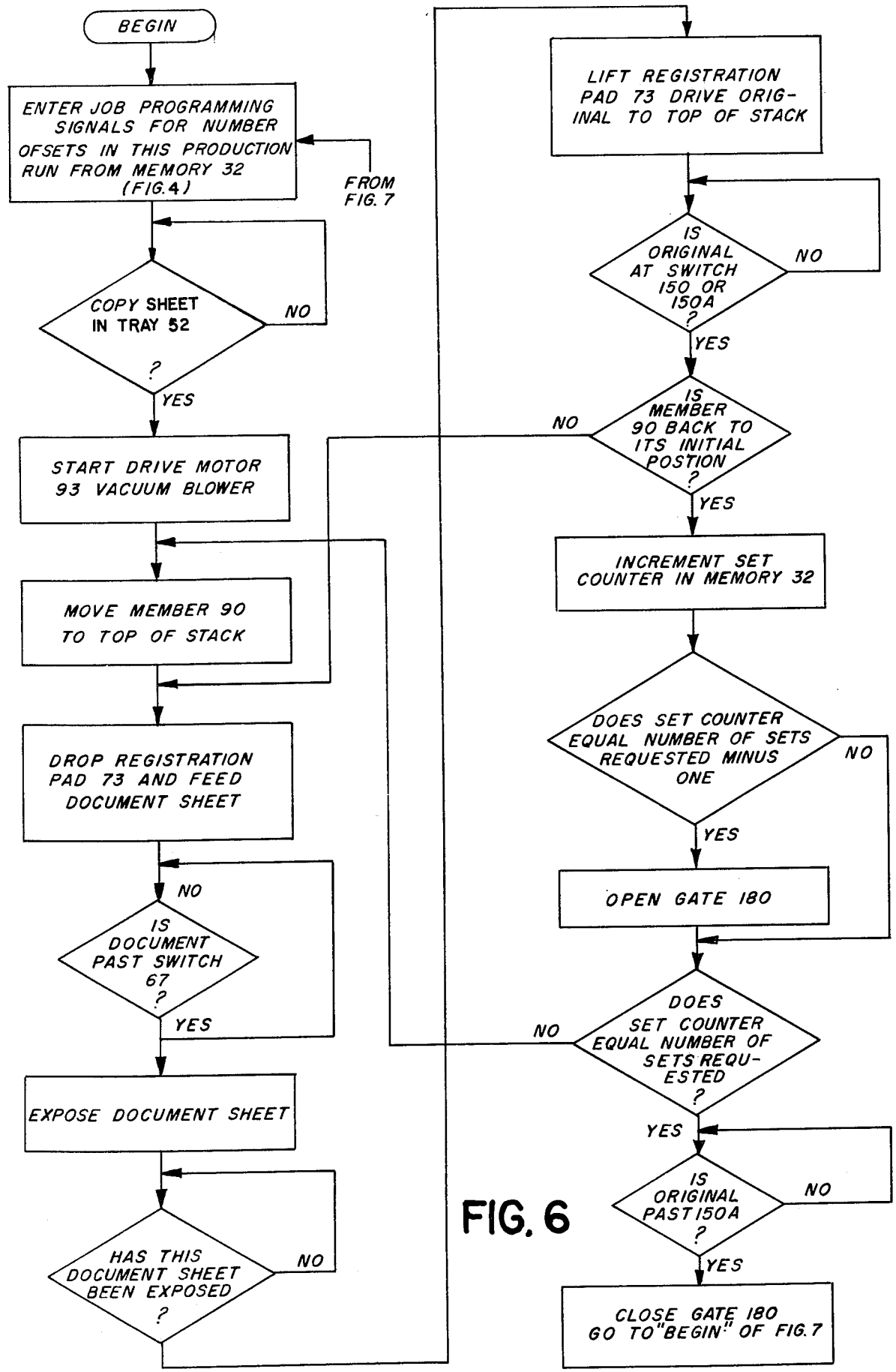
FIG. 6 is a flow chart of the collate mode of operating the feeder and copier of FIG. 1.

In the upper left hand portion of FIG. 3, there is shown a separator member 90 which extends through the opening 62 in the rearward wall plate 59 into the originating stack in the supply tray 52. The bottom surface of separator member 90 initially engages the top sheet of a document stack. At the rearward edges R, the separator member 90 separates the document sheets S in the stack which have been exposed from those which remain to be exposed. The separator member 90 is fixed to a rotatable support shaft 91. As the document sheets S are fed in succession from the stack bottom to the exposure platen 2 and returned singly to the stack top, the separator member 90 rotates incrementally in a clockwise direction at the shaft 91. When the last sheet to be exposed is fed from the stack bottom, the separator member 90 drops through an opening 92 in the floor plate 56 of the supply tray 52. Where two or more feeding cycles are required or several collated copies of a multi-sheet document are desired, after the last sheet to be exposed a first time is returned to the stack top, the separator member 90 is moved by suitable drive means, not shown, onto the topmost sheet in the stack. When the separator member 90 drops through the opening 92 in the floor plate 56, a switch 125 is closed which provides a pulse signal to the LCU 31 in the copier 1 on line 124, as shown in FIG. 1. This signal indicates to the LCU 31 that a copy sheet set has been made. The LCU 31 by means of a copy set counter in the temporary memory 32 totalizes the number of copy sets which have been made. When the number of sets is equal to the number of sets requested minus one, the LCU 31 opens the gate 180. After each document sheet is now copied, it is deposited in the receptacle 151. At the end of the copy job, the computer recognizes concurrence between the number of sensed switch actuations and the number of copy sets requested by an operator. Then, after the last document sheet is exposed and fed to the receptacle 151, the gate 180 is closed and the recirculating feeder 50 is deactivated. This operation will be explained more fully when FIGS. 5 and 6 are described.

Figure 3A:
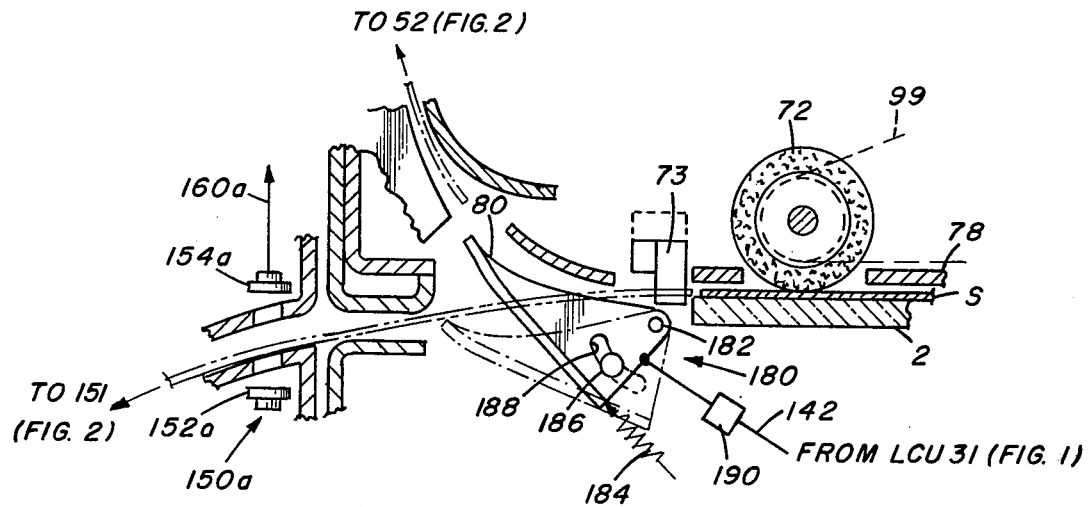
FIG. 3A shows in more detail the gate member 180 of the recirculating feeder shown in FIG. 3.

The gate 180, shown in FIG. 3, is set forth in more detail in FIG. 3A. In FIG. 3A, the solid lines depict the gate 180 in its closed position wherein its guide surface 80 directs document sheets towards the feeder tray 52. After the pad 73 is lifted, the LCU 31 causes the gate 180 to move to a retracted position shown by dotted lines. The gate 180 is pivotably mounted on a pin 182 and urged to its closed position by a spring 184 which caused a fixed-position pin member 186 to engage the rear surface of a slot 188 formed in the member 180. A signal on lead 142 from the LCU 31 energizes a solenoid 190 which moves the gate 180 to its opened position. More specifically, the energized solenoid 190 pivots the gate 180 about pin 182 (overcoming the force of spring 184) until the pin 186 engages the top surface of the slot 188, as shown in dotted lines. When the pad 73 is lifted to its dotted line position, a document sheet is Fed Past switch 150a towards the receptacle 151 (See FIG. 2). The switch 150a operates in the same manner as the switch 150 (see upper left hand corner of FIG. 3) and includes a source of light 152a and a receiving photocell 154a. A lead 160a is sampled at the appropriate times by the LCU 31 to determine if there has been a document sheet jam.

Figure 3B:
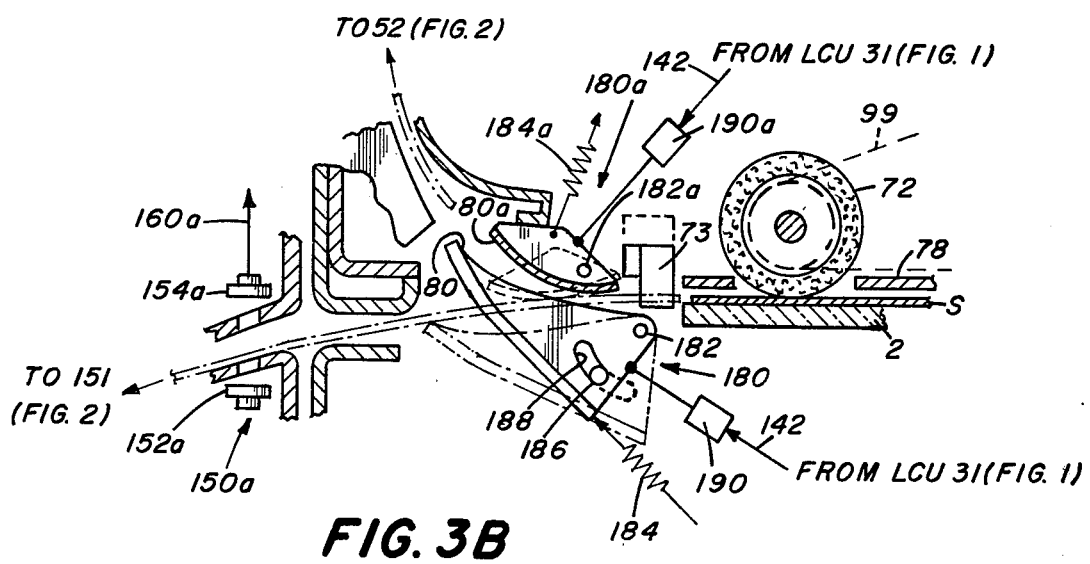
FIG. 3B is an alternative of the gate member 180 shown in FIG. 3.

Another embodiment of the gate 180 is shown in FIG. 3B. It is similar to the structure of FIG. 3A except that it includes a second movable member 180a is pivotably mounted on a pin 182a. The member 180a is urged by a spring member 184a to the solid line position when the gate 180 is open. An arcurate surface 80a of the member 180a helps to direct document sheets to the tray 52. When the lead 142 is turned on by the LCU 31, it not only energizes solenoid 190 but also energizes a solenoid 190a which moves the member 180a to the dotted line position. The use of member 180a helps to ensure proper guidance of document sheets and thereby prevents inadvertent jamming of documents especially when document sheets are being recirculated to the tray 52.

Figure 2A:
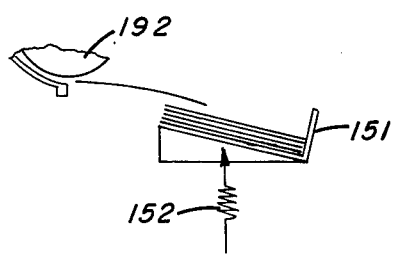
FIG. 2A shows a schematic illustration of the document receptacle of FIG. 2.

As shown in FIG. 2, moving document sheets exiting from the feeder to the receptable 151 are guided by a chute 190 until they engage a rotating cylinder 192 which engages and propells them into the receptacle 151. Formed in the bottom wall of the receptacle is a recess 193 which facilitates removal of documents by an operator. It will be understood that the receptacle 151 can be slidably mounted to further facilitate removal of documents. FIG. 2A schematically shows that the hopper 151 may be urged by a spring 152 to a position where the top document sheet is maintained at a substantially constant level.

Feeder Operation, Logic and Jam Detection (FIG. 3)

In the feeder 50, a plurality of sensors along the document sheet feed path provide inputs to the LCU 31. Next to the tensioning pulley 104 is a light emitting diode LED 130 which directs a beam of light towards a photocell 132. If no document sheet is present, the photocell 132 signals the LCU 31 over lead 134 that the document supply is empty. The LCU 31 will then shutdown the feeder by de-energizing the clutch 115. A switch 67 is disposed adjacent the feeding nips of the feeding rollers 68 and backup rings 69. When a document sheet S passes by this switch 67, the switch closes and a logic "1" is sent to the LCU 31 by a lead 140. When no document sheet is at this position in the feed path, the lead 140 indicates a logic "0" to the LCU 31. If the gate 180 is opened, then the switch 150a is sampled to determine the presence or absence of a document sheet in the path to the receptacle 151. If the gate 180 is closed, then the document sheet is propelled towards the tray 52. Near the supply tray 52 is a sheet return switch 150 which includes an LED 152 and a photocell 154. The photocell 154 sends logic signals "1" and "0" to the LCU 31 over lead 160, indicating the presence or absence of a document sheet, respectively, at this position. In order to determine if there has been a document sheet jam in the feeder 50, the leads 140, 142 and 160 are sampled by the LCU 31 at the appropriate times in accordance with the perforations on the copier web 5 to see if each fed document has cleared each of these positions. If a document sheet has not cleared each position, a jam is indicated and the feeder is "hard shutdown". However, the copier is permitted to complete the copies in process.

As previously noted, the feeder 50 can operate in collate and noncollate modes. Both modes of operation are quite similar. The following events occur in either mode of operation:

1. After a document is released and placed by the job stream programmer apparatus 200 in the document tray, the photocell 132 signals the LCU 31 over lead 134 that a document is present in the tray.

2. The LCU 31 now energizes the solenoid 120, motor 93, and clutch 115, as well as a vacuum motor, not shown, and causes the separator member 90 to be moved to the top of the document stack. After the vacuum has had time to reach its proper level, the LCU 31 issues the first document sheet feed command. The bottom-most document sheet in the document tray is fed past the switch 67 and is registered against the pad 73.

3. A document sheet is exposed once in the collate mode and returned to the top of the stack. In the noncollate mode, a document sheet is exposed a number of times until the copies processed count (the number of image exposure flashes) equals the copies requested count. These counts are in temporary storage memory 32 of the computer. After the appropriate number of copies are made (before the pads 73 are lifted), the LCU 31 will have energized solenoid 190 (see FIG. 3A) and opened the gate 180 so that the document sheet is moved past switch 150a into the document receptacle 151.

4. Now the second feed command is given and the second original document sheet is fed to the platen 2. In the collate mode, continuity in the feeder operation is maintained by setting the first original sheet on top of the stack before the trailing edge of the second document sheet leaves the stack.

5. In the collate mode, the feeding process continues until the sets processed (i.e. the number of signals from the switch 125) coincides with the sets requested. The document sheets on the last set are, of course, not returned to the tray 52 but rather are delivered to the receptacle 151. In the noncollate mode, the feeding process continues until all document sheets in the document tray have been fed as indicated by a single signal from the switch 125. In this mode of operation, after a document sheet has been copied the desired number of times, it is delivered directly to the receptacle 151 and is not returned to the tray 52.

6. When the feeding process is complete, the feeder is turned "OFF".

7. If a paper jam occurs in the feeder, the feeder drive motor 93 and blower motor are immediately turned "OFF". The copier is allowed to clear itself of copies before being turned "OFF". A visual signal appears on the operator display panel 49a to alert the operator to clear the jam.

Referring now to FIG. 5, a flow chart is shown for the operation of the feeder 50 in the noncollate mode of operation. For the sake of clarity of explanation, it will be assumed that a matrix reader is not employed and an operator has actuated keyboard 49 to enter job programming instructions into temporary memory 32 (See FIG. 4). Such instructions, of course, include the number of copies to be made of each document sheet of the document D inserted into tray 52. The first decision that LCU 31 makes is: is there a document in the tray 52.

This is accomplished by sampling the lead 134 connected to the photocell 132 to determine if it is in a logic "1" or a logic "0" state. If a document is not present in the tray 52, the feeder cannot be started. However, if it is present, the LCU 31 energizes the drive motor 93 and causes the separator member 90 to move to the top of the document stack. The LCU 31 also energizes solenoid 190 and opens gate 180. Next, the LCU 31 de-energizes the solenoid 120 which drops the pads 73 and also energizes the clutch 115 which causes a document sheet to be fed from the bottom of the stack along the feed path.

Assuming the document sheet has passed the switch 67 correctly and is now located at the exposure platen 2, the document sheet is now exposed. The next decision is FIG. 5 is: "is requested number of exposures of this document sheet completed?" This question is asked by the LCU 31 after each exposure, by checking, to see if the process count equals the copies requested count. If the LCU 31 determines that more copies are to be made, then exposures of such copies are continued until the counts are equal. At such time, the solenoid 120 is energized, the pad 73 is lifted and the document sheet at the exposure platen 2 is driven toward the receptacle 151. The computer will then check to see if this document sheet has advanced to the switch 150a. If the document sheet does not clear the switch 150a, a jam will be indicated and an appropriate indicator on the operator panel will be illuminated and the feeder will be shut down. If there was no jam, the LCU 31 then determines whether this production run is completed. If no, the logic branches back to position where pad 73 is dropped as the next document sheet is fed. The above process is repeated. If, however, the production run is completed (yes), then switch 150a is sampled for a jam and if there is no jam the LCU closes gate 180 and the program branches to the logic shown in FIG. 7. The job stream programming apparatus now inserts the document into the feeder.

FIG. 6 shows the flowchart for the collate mode of operation. First, job programming information signals are entered into the central progressing unit of the computer. The starting sequence is similar to FIG. 5. After the separator member 90 has returned to its initial position at the top of the stack, a document sheet is fed to the platen 2, assuming it was not jammed at switch 67. The sheet is now exposed. Prior to the last set to be made, the switch 150 is sampled to see if there is a document sheet jammed on its return path to the tray 52. On the last set, the switch 150a is sampled to determine if a sheet has been properly feed to the receptacle 151. After the sheet has been returned to the stack, if the member 90 has not returned back in its initial position, the logic branches back to just prior to feeding a document sheet. If the member 90 has moved through hole 92 back in its initial position at the top of multi-sheet document, a set is completed and lead 124 provides the previously described pulse signal to the LCU 31 which stores a count in a memory location of the temporary storage memory 32. As previously indicated, this signal from the lead 124 to the LCU 31 causes the set counter to be incremented by 1. The computer then asks the question: "does set counter equal number of sets requested minus 1?" If the answer to that question is yes the gate 180 is opened. Next the LCU 31 makes a decision whether or not the number held in the set counter equals the number of sets requested. If the answer to that question is no, the flow chart branches back to the position, just prior to moving member 90 to its initial position and the process of making copies is repeated. If the answer to the question is yes, the switch 150a will be checked for a document sheet jam. If no document sheet was jammed at switch 150a, the LCU 31 will close gate 180, and branch to the logic of FIG. 7. It should be noted, that when the set count equals the number of sets requested minus one the answer to the next question is always no and the logic always branches. On the next set pass, the answer always will be yes.

Job Stream Programmer Apparatus (FIG. 2)

Figures 2B, 2C:
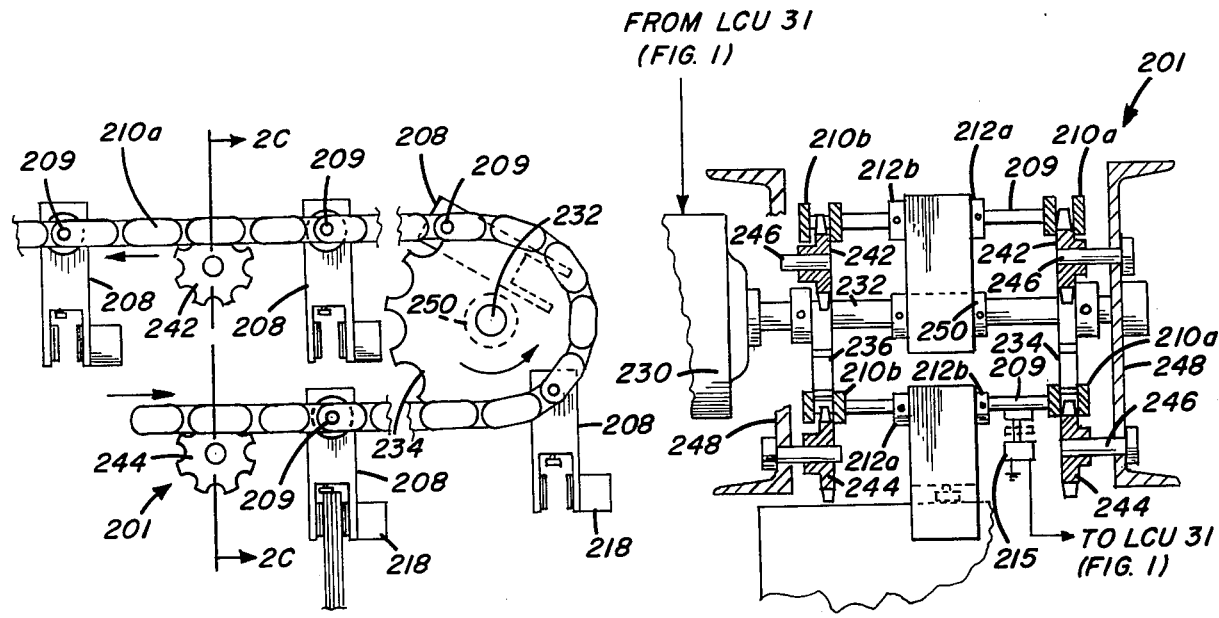
FIG. 2B shows in more detail a portion of the job stream programming apparatus of FIG. 2, namely a mechanism 201 for receiving and moving documents along a path.
FIG. 2C is a sectional view taken along line 2C—2C of FIG. 2B.
Figures 2D, 2E:
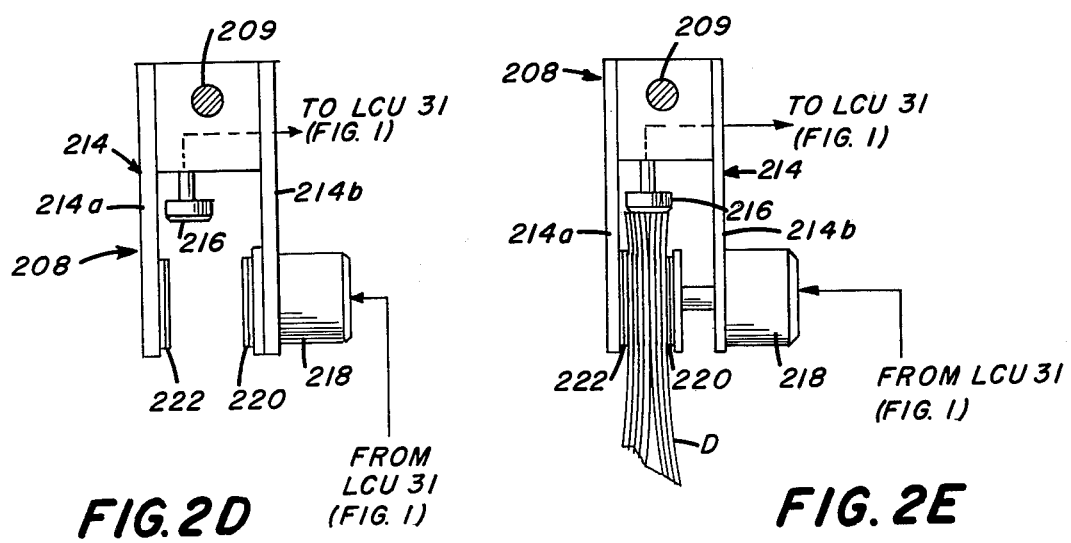
FIGS. 2D and 2E depict the two operating positions of the clamps 208 shown in the mechanism 201 of FIG. 2A.

FIG. 2 and FIGS. 2A through 2G disclose the job stream programmer apparatus 200. The job stream programmer apparatus 200 includes a mechanism 201 (See FIGS. 2B and 2C) which receives a document and moves it along a path which intersects the feeder 50 and a mechanism 203 (See FIGS. 2F and 2G) which releases a particular one of the documents from mechanism 201 and inserts it into the feeder tray. As shown in FIG. 2, the mechanism 201 includes a number of clamps 208. An operator may take a single or a multi-sheet document D from a work platform 206 and insert it into one of the clamps 208. Each slamp 208 is rotatably mounted on a shaft 209 and centrally located on the shaft by collar members 212 (A and B) which are secured to shaft 209 by set screws. (See FIG. 2C–E). The shaft 209 is fixed at its remote ends between two spaced chain rollers 210a and 210b respectively. (See FIG. 2C). A representative clamp 208 is shown in detail in FIGS. 2(D and E). It is formed with a U-shaped body 214. When a document D is inserted between two spaced arms 214a and 214b the top of the document sheets engage a switch 216 which sends a signal to the LCU 31 indicating a document D has been inserted into the particular clamp 208. The LCU 31 then causes solenoid 218 to be energized and it moves a plunger-type member 220 to a position to secure the document D between a pad 222 formed on the arm 214a and the plunger member 220. Prior to this time the operator would have entered job programming information via the keyboard 49 into the LCU 31 and such information stored in a memory location which corresponds to the particular clamp 208 in which the document was inserted. The operation is slightly altered if the matrix reader 204 is going to be used. This will be discussed later. As shown in FIGS. 2B and C mechanism 201 includes a plurality of idler sprockets, upper idler sprockets 242, and lower idler sprockets 244. These sprockets are rotatably mounted on stub shafts 246 which in turn are rigidly fixed to two structural members 248. The structural members also provide mounting means for the motor drive shaft 232. Centrally mounted on the shaft 232 is a rubber sleeve member 250 which, as shown in dotted lines in FIG. 2B, engages a clamp 208 as its direction is being reversed at that position of the endless path where the chain rollers 210 (a and b), carrying shaft 209, reverse direction and begin to move back towards the work platform 206.

After a document in the recirculating feeder 50 has been copied, the LCU 31 energizes a motor 230 which drives a shaft 232 to which are affixed to two drive sprocket members 234 and 236. The sprocket members 234 and 236 in turn move the roller chains 210a and 210b, respectively. It will be noted that there are two driven sprocket members 238 amd 240 at the exterior opposite end of the path of the chains 210a and 210b (See FIG. 2). The motor causes the sprockets 234 and 236 to move the documents D along a path which intersects the feeder 50, until the next document D to be copied is above the feeder 50. At this time, the shaft 209 closes a switch 215. (See FIG. 2C). Although the switch 215 is shown schematically, it will be understood that there is a separate switch 215 for each clamp 208. Thus if a clamp 208 contains a document and its corresponding switch 215 is closed, the document is positioned directly above the feeder. Therefore, the LCU 31 in response to the switch 215 closing de-energize the motor 230 and the document is directly positioned above the feeder.

Figure 2F:
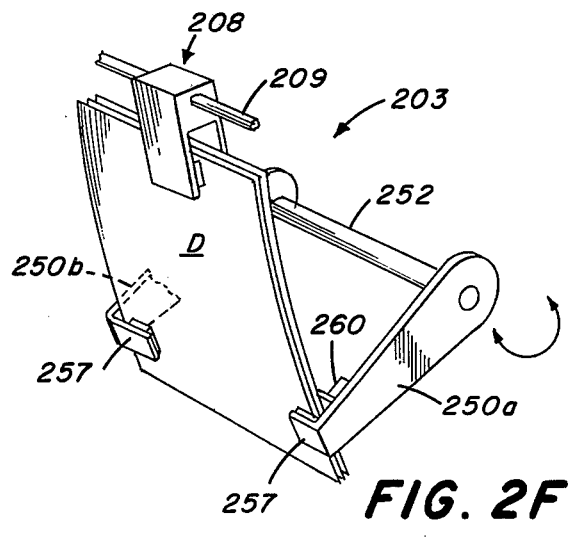
FIGS. 2F and 2G depict in more detail the mechanisms depicted in FIG. 2 for releasing a document from a clamp 208 (see FIGS. 2D and 2E) and inserting it into the receiving tray of the recirculating feeder (see FIG. 3)
Figure 2G:
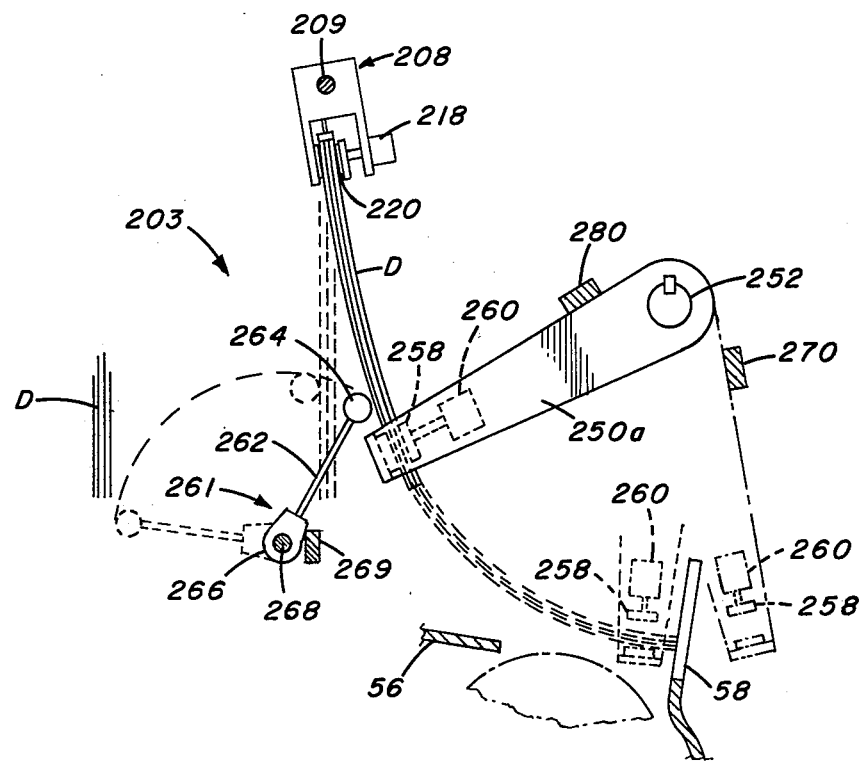

After a document in the feeder has been copied, and placed in receptacle 151, the document above the feeder 50 is ready to be inserted into the feeder tray. Towards this end, as shown in FIGS. 2 and FIGS. 2F and 2G, mechanism 203 includes two spaced document pick-up arms 250a and 250b which are respectively keyed to ends of a rotatable shaft member 252. The shaft 252 is driven by a solenoid member 256 (see FIG. 2) in a manner as will be explained shortly. At the free end of the arms 250a and b, there are channel-like (V-shaped) document pick up devices 257 which are similar in construction to the clamps 208. Each device 257 includes a plunger 258 driven by a solenoid 260.

As shown in FIG. 2 and FIG. 2G mechanism 203 further includes a document positioning mechanism 261 which in turn includes a rod 262 having a spherical document-engaging member 264 mounted on one end and a retaining block 266 is secured to the other end. Block 266 is fixedly secured to rotatable shaft 268.

After a document D is positioned by the mechanism 201 above the feeder 50, the LCU energizes a solenoid (not shown) which rotates shaft 268 in a clockwise manner from its dotted line position to the position shown in solid lines (See FIG. 2G). At this latter position, the block 266 engages a stop 269 and closes a switch (not shown) which provides a signal to the LCU 31.

The LCU 31 now energizes solenoid 256 (shown in FIG. 2) which causes the shaft member 252 to rotate in a clockwise direction, as shown in FIG. 2G, from the position shown in dotted lines where arms 250a and 250b abut a stop bar 270, through openings 58a and 58b (see FIG. 2) in the wall plate 58 of the feeder tray 52 to the position shown in solid lines where the arms 250a and 250b abut a stop bar 280. After the arms 250a and 250b engage the stop bar 280, a switch (not shown) is closed which sends a signal to the LCU 31. In response to this signal, the LCU 31 energizes the solenoids 260, which cause the plungers 258 move to clamp the document D in document pick-up mechanisms 257. The LCU now de-energizes solenoid 218 of claim 208 and solenoid 218 retracts plunger 220 releasing the document. The LCU 31 now applies reverse current to the solenoid 256 and the arms 250a and 250b and document D secured in pick-up mechanisms 257 move downwardly in a counterclockwise direction. The document D is guided in this downward move by its sliding engagement with the spherical document engaging member 264. Prior to the arms 250a and 250b passing by the wall 58, the LCU 31 de-energizing the solenoids 260 and the plungers 258 are retracted. The LCU 31 de-energizes solenoid 256 and the arms 250a and 250b continue to move pass the wall 58 until they abut the stop 270. At this time a switch (not shown) on the stop 270 is closed and a signal sent to the LCU 31 indicating a document D has been inserted in the tray 52 of the feeder 50. The sheets of the document D are now disposed in the position shown in FIG. 3. The LCU 31 now causes the document positioning mechanisms 260 to move to their dotted line position. The feeder 50 is now activated by the LCU 31 and reun in accordance with the flow charts shown in either FIGS. 5 or 6.

Figure 7:
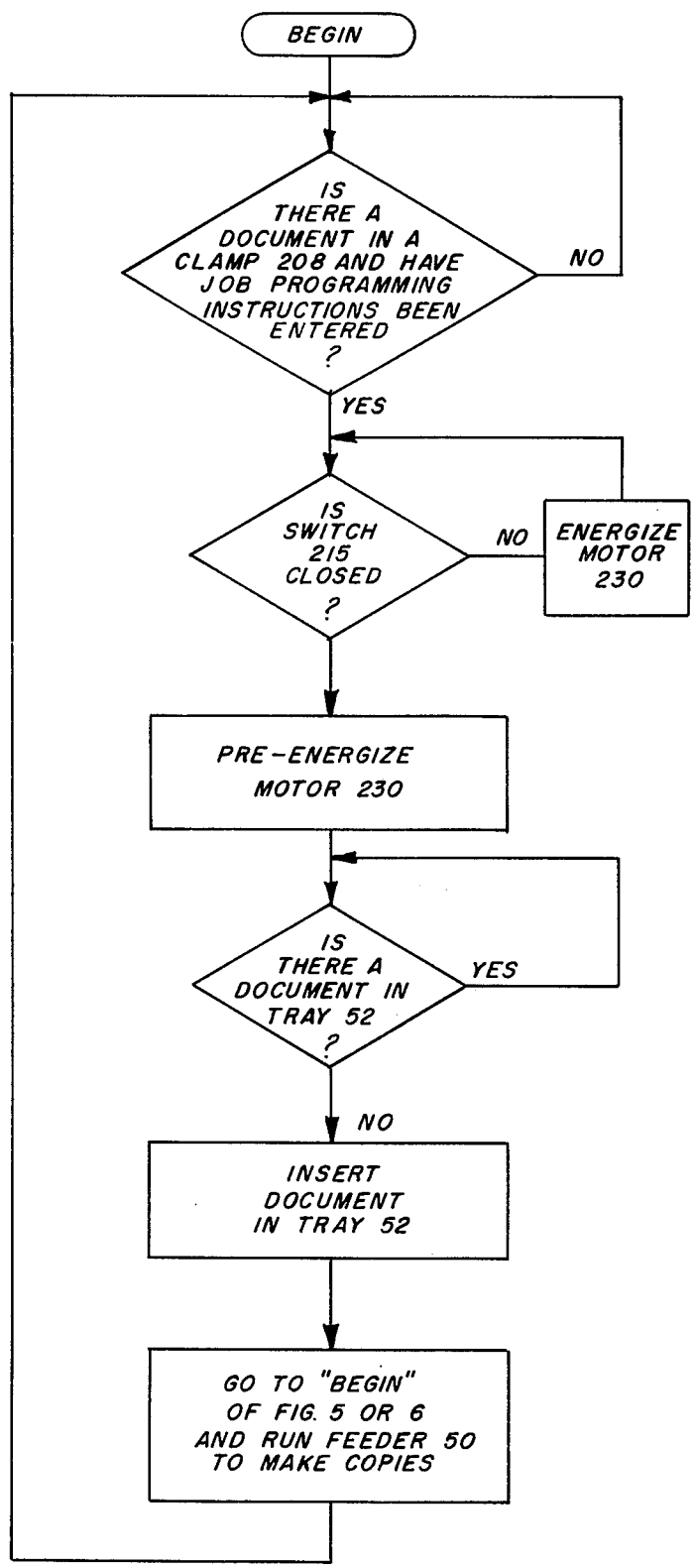
FIG. 7 is a flow chart of the operation of the job stream programmer apparatus shown in FIG. 2.

Job Stream Programmer Apparatus Operation (FIG. 7)

Turning now to FIG. 7, there is shown a flow chart of the operation of the job stream programmer apparatus 200. The first question the logic asks is: Is there a document in one of the clamps 208 and has job programming instructions for that document been entered into the LCU 31? If the answer is "yes" then the LCU 31 determines if the particular switch 215 corresponding to the clamp 208 which holds the document, is closed. If no, then motor 230, which is adapted to drive sprockets 234, 236 and chain rollers 210a, 210b is energized. When the corresponding switch 215 is closed, the LCU 31 de-energizes 230. If there is no document in the tray 52, mechanism 203 inserts the document into the tray 52 of the feeder in the manner as has been discussed above. If a document is in the tray 52, the job programmer apparatus 200 waits until the tray is empty and then it inserts the document into the tray. The feeder 50 is now run in either a noncollate mode (See FIG. 5) or a collate mode (See FIG. 6) as previously selected by the operator. When the document has been copied the desired number of times, the next document to be copied is inserted into the feeder tray.

In the situation where the matrix reader 204 is employed, the job programming instructions are read off the form 202 (See FIGS. 2 and 2H) only after the switch 215 is closed. These instructions are entered into the LCU 31. When the feeder tray 52 is empty, the document is then inserted by the mechanism 203 into the tray. The feeder 50 is now operated in accordance with the logic of FIG. 5 of FIG. 6. However, it will be appreciated that there is no purpose to copy the form 202. Therefore, under the control of the LCU 31, the first time form 202 is fed, exposure is inhibited, gate 180 is opened, and form 202 is delivered directly to the receptacle 151. In the collate mode of operation, the gate 180 is now closed and copying proceeds as set out in FIG. 6. In the noncollate mode, the gate 180, of course, remains open.

The invention has been described in detail with particular reference to preferred embodiment thereof, but it will be understood that variations and modifications can be effected within the scope of the invention.

I claim:

1. Job stream programmer apparatus for use with a copier having a feeder for sequentially feeding sheets of a single or multi-sheet document to be copied from support means to the exposure platen of the copier, comprising:
   (a) memory means for receiving and storing job programming signals corresponding to requested numbers of copies of documents to be made;
   (b) means for receiving a plurality of documents and effective to move such received documents along a path which intersects said support means;
   (c) means for releasing and placing a selected one of the received documents on said support means; and
   (d) control means responsive to the stored job programming signals corresponding to the selected document for causing said feeder to feed the sheets of such selected document to said exposure platen so that the requested number of copies are produced by the copier.

2. The invention as set forth in claim 1 including a document receiving receptacle; and where said control means causes said feeder to transport said document sheets from said exposure platen to said receptacle after they have been copied a desired number of times, said control means being adapted to actuate (1) said receiving and moving means causing it to move received documents along said path, and (2) said releasing and placing means which releases and places another selected document on said support means.

3. Job stream programmer apparatus for use with a copier including a feeder having a receiving tray in which a single or a multi-sheet document is inserted, said feeder being adapted to feed sheets of such inserted document to the exposure platen of the copier, comprising:
   (a) memory means for receiving and storing job programming signals corresponding to selected numbers of copies of documents to be copied;
   (b) a first mechanism for receiving a plurality of documents and effective to move such received documents along a path which intersects said feeder;
   (c) a second mechanism for releasing a predetermined document from said first mechanism when such document is disposed in a predetermined position relative to feeder and inserting such document into said feeder tray after the document previously inserted in said feeder has been copied; and
   (d) means responsive the stored programming signals corresponding to the inserted document for causing said feeder to feed the sheets of such document to said exposure platen so that the requested number of copies are produced by said copier.

4. The invention as set forth in claim 3 including a document receiving receptacle; and where said control means causes said feeder to transport said document sheets from said exposure platen to said receptacle after they have been copied a desired number of times, said control means being adapted to actuate (1) said first mechanism causing it to move received documents along said path, and (2) said second mechanism causing it to insert another selected document in said tray.

5. The invention as set forth in claim 4 wherein said feeder is a recirculating feeder which is effective to produce collated copy sheet sets of an inserted document, said feeder being adapted to sequentially transport document sheets from said receiving tray to said exposure platen where they are copied, and back to said tray until the last set is to be made, at which time said control means causes said feeder to transport document sheets to the exposure platen where they are copied, and then deliver such sheets to said receiving receptacle.

6. The invention as set forth in claim 5 wherein documents are inserted by said second mechanism in said tray in the same order they are received by said first mechanism.

7. Job stream programmer apparatus for use with a recirculating document feeder coupled to a copier, wherein said feeder is selectively operable in collate or noncollate recirculating modes, in the collate mode said feeder transports document sheets from a tray wherein a document is inserted to an exposure platen and back to said tray until the last set of copies of the document being copied is to be made, at which time a gate located between said platen and said tray said gate being disposed so that when it is opened document sheets which are transported from said tray to said exposure platen are then moved past said gate to a receiving receptacle in the noncollate mode said gate is opened so that document sheets transported from said tray to said exposure platen are delivered to said receptacle without returning to said tray, said job stream programmer apparatus comprising:
   (a) memory means for receiving and storing job programming signals corresponding to collate or noncollate modes of operation of a particular document and the number of copies of such document to be made;
   (b) a first mechanism for receiving a plurality of documents and effective to move such received documents along a predetermined path which intersects said feeder;
   (c) a second mechanism including means for inserting a particular document received by said first mechanism into said feeder after the document previously inserted in said feeder is in said receptacle; and
   (d) control means responsive to said job programming signals corresponding to said particular, document inserted in said tray for controlling the operation of said feeder, gate, and copier to selectively make collated or noncollated copies of said particular document in accordance with said job programming signals, whereby after said particular document is copied in accordance with said job programming signals, said control means opens said gate causing document sheets to be fed to said receptacle.

* * * * *